United States Patent [19]

Okada

[11] Patent Number: 4,650,052
[45] Date of Patent: Mar. 17, 1987

[54] CIRCUIT FOR DRIVING SOLENOID CLUTCH

[75] Inventor: Shigeru Okada, Higashimatsuyama, Japan

[73] Assignee: Diesel Kiki Co., Ltd., Japan

[21] Appl. No.: 754,841

[22] Filed: Jul. 12, 1985

[30] Foreign Application Priority Data

Jul. 13, 1984 [JP] Japan .................. 59-144320

[51] Int. Cl.$^4$ .................. F16D 27/00; H01F 7/18
[52] U.S. Cl. .................. 192/84 C; 361/154
[58] Field of Search .................. 192/3.56, 84 C, 84 R, 192/84 B, 21.5, 0.076, 0.03, 84 A; 361/154, 152, 160

[56] References Cited

U.S. PATENT DOCUMENTS 4,509,091  4/1985  Booth .................. 192/84 C X
4,567,975  2/1986  Roll .................. 192/84 C Primary Examiner—George H. Krizmanich
Attorney, Agent, or Firm—Guy W. Shoup

[57] ABSTRACT

A circuit for driving a solenoid clutch in which an input side rotating member and an output side rotating member are separated by a gap at the completely disengaged state comprises a voltage generator capable of generating at least the rated voltage of the solenoid clutch and an initial exciting voltage by which a minimum attracting force for the engagement is provided to an electromagnet of the clutch, and a controller for controlling the supply of the output voltage from the voltage generator in response to a command to engage the solenoid clutch in such a way that the rated voltage is applied to the solenoid clutch after at least the initial exciting voltage is applied to the solenoid clutch for a predetermined period. The application of the initial exciting voltage makes the electromagnet to produce a week attracting force, so that the transmitted torque of the solenoid clutch is small. In this state, the solenoid clutch is completely engaged without shock by the application of the rated voltage.

11 Claims, 8 Drawing Figures

FIG. 3E    LEVEL OF DRIVING VOLTAGE OF EXCITING COIL 9

FIG. 3F    TRANSMITTIED TORQUE OF SOLENOID CLUTCH    $T_t$

CIRCUIT FOR DRIVING SOLENOID CLUTCH

BACKGROUND OF THE INVENTION

The present invention relates to a circuit for driving a solenoid clutch, and more particularly to a solenoid clutch driving circuit for driving a solenoid clutch wherein a gap is present between an electromagnet and an associated attracted member when in the disengaged state so as to cause the solenoid clutch to engage without shock.

A solenoid clutch wherein a gap is present between an electromagnet and an associated attracted member when in the disengaged state is used, for example, in auxiliary machines connected with engines, one example being the car air conditioner. Since such a solenoid clutch is completely engaged in a single action at the time of the application of an exciting current, a large mechanical shock occurs on both the driving and driven sides of the solenoid clutch so that the service life of the clutch and the associated apparatus are shortened and the engaging operation of the solenoid clutch is not smooth. To solve these drawbacks, the applicant proposed a circuit for controlling a solenoid clutch for a compressor in which the pulse width of a driving pulse applied thereto at the time of the start of the solenoid clutch is made gradually wider so as to gradually operate the compressor (Japanese Patent Public Disclosure No. 191326/58).

However, although the proposed controlling circuit is effective for a solenoid clutch having no such gap, the proposed control circuit cannot eliminate the mechanical shock at the time of engaging a solenoid clutch which has a gap between an electromagnet and an associated attracted member when in the disengaged state. Since the electromagnetic attracting force acting between the electromagnet and the associated attracted member is inversely proportional to the square of the gap width therebetween, even if the level of the exciting current is gradually increased by the gradual increase of the pulse width of the driving pulse for driving the solenoid clutch, the solenoid clutch is instantly engaged when the level of the exciting current reaches the value at which the attracted member starts to move under the attractive force of the electromagnet.

SUMMARY OF THE INVENTION

It is an object of the present invention to provide an improved circuit for driving a solenoid clutch, which is capable of eliminating the drawbacks of the conventional solenoid clutch control circuit.

It is another object of the present invention to provide a circuit for driving a solenoid clutch wherein a gap is present between an electromagnet and an associated attracted member when in the disengaged state so as to cause the solenoid clutch to engage without mechanical shock.

According to the present invention, in a circuit for driving a solenoid clutch which includes an electromagnet and has an input side rotating member and an associated output side rotating to be engaged with the input side rotating member, the input side rotating member and the output side rotating member being separated by a gap when the solenoid clutch is in the completely disengaged state, the circuit comprises means for producing a command signal for commanding the engagement/disengagement of the solenoid clutch, a voltage generating means which is capable of generating at least the rated voltage of the solenoid clutch and an initial exciting voltage by which a minimum attracting force for the engagement is provided to the electromagnet, and a control means responsive to the command signal for controlling the supply of the output voltage from the voltage generating means in such a manner that the rated voltage is applied to the solenoid clutch after at least the initial exciting voltage is applied to the solenoid clutch for a predetermined period when engaging the solenoid clutch.

With this construction, since the initial exciting voltage is applied to the solenoid clutch at the time of the starting of the engagement of the solenoid clutch, the electromagnet of the solenoid clutch is made to operate so as to produce a weak attracting force, so that the transmitted torque of the solenoid clutch is small. In this state, the rated voltage is applied to the solenoid clutch to bring the solenoid clutch to the completely engaged state. As a result, a slip state will arise only for a short time at the time of the start of the engaging operation of the solenoid clutch and the engaging state of the solenoid clutch is smoothly changed from the slip state to the completely engaged state. Thus, the shock arising at the time of the engaging operation is remarkably reduced.

In order to prevent shock at the disengaging of the solenoid clutch, the level of the driving voltage may be changed from the rated voltage to a disengaging voltage whose level is slightly less than the initial exciting voltage when disengaging the solenoid clutch.

Further objects and advantages of the present invention will be apparent from the following detailed description to be read in conjunction with the accompanying drawings.

BRIEF DESCRIPTION OF THE DRAWINGS

FIGS. 3A through 3F are waveforms showing signals in FIG. 1 and the transmitted torque.

DESCRIPTION OF THE PREFERRED EMBODIMENTS

Figure 1:
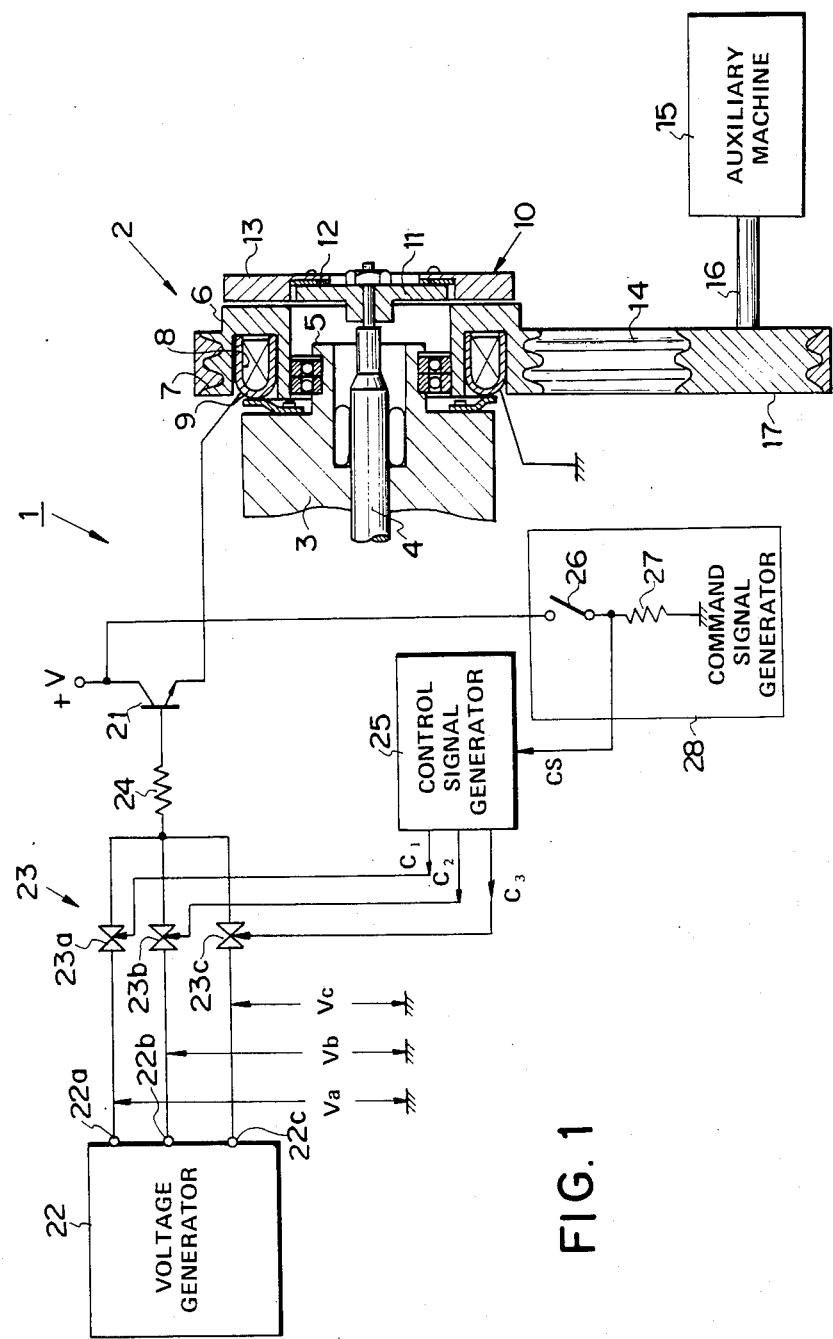
FIG. 1 is a circuit diagram of one embodiment of a clutch driving circuit of the present invention, also including a cross-sectional view of a part of a solenoid clutch driven by the circuit.

FIG. 1 is a circuit diagram of an embodiment of a clutch driving circuit for a solenoid clutch according to the present invention, which also shows the construction of a solenoid clutch. The driving circuit 1 shown in FIG. 1 is for driving a solenoid clutch 2 which is of the type wherein a gap is present between an electromagnet and an associated attracted member when the solenoid clutch is in the disengaged state, so as to cause the solenoid clutch to engage/disengage without shock. The solenoid clutch 2 has a driven shaft 4 which is rotatably supported by a housing 3 and a rotor 6 rotatably supported on the outer surface of a cylindrical portion 5 projecting from the housing 3 so as to envelop the driven shaft 4. A groove 7 for a V-belt 14 is defined on the outer surface of the rotor 6 and an exciting coil 9 is provided in a space 8 defined on a side surface of the rotor 6 so as not to come in contact with the rotor 6. On the other hand, a rotating assembly 10 is provided on the driven shaft 4. The rotating assembly 10 has a conventional construction including a hub 11 secured on the driven shaft 4 and an attracted plate 13 which is made of a magnetic material and is connected with the hub 11 through a leaf spring 12.

Since the attracted plate 13 is located close to the outer periphery of the hub 11 as separated therefrom by a gap of predetermined width and is supported by the leaf spring 12, when the exciting coil 9 is energized, the attracted plate 13 can move along the axis of the driven shaft 4 while maintaining its parallel relationship with the rotor 6 until it comes in contact with the rotor 6. Since the leaf spring 12 is deflected in this state, when the exciting coil 9 is deenergized, the attracted plate 13 is returned to its original position by the restoring force of the leaf spring 12.

Consequently, when the exciting coil 9 is energized, the attracted plate 13 is attracted to the side surface of the rotor 6, thereby engaging the solenoid clutch. As a result, the rotor 6 rotates together with the rotation of the driven shaft 4. When the exciting coil 9 is deenergized, the attracted plate 13 departs from the rotor 6 by the predetermined gap width, returning the solenoid clutch 2 to the disengaged state.

The rotor 6 is linked by the V-belt 14 with a pulley 17 secured on a driving shaft 16 of an auxiliary machine 15, which may be any of various kinds of machines used with internal combustion engine vehicles, so that the torque of the driven shaft 4 is transmitted to the driving shaft 16 to drive the auxiliary machine 15 when the solenoid clutch 2 is engaged.

The driving circuit 1 for driving the solenoid clutch 2 so as to engage/disengage has a voltage generator 22 for generating three output voltages, $V_a$, $V_b$ and $V_c$, which are derived from output terminals $22_a$, $22_b$ and $22_c$ and input to an analog switch circuit 23. The analog switch circuit 23 has three analog switching elements, $23_a$, $23_b$ and $23_c$, which are controlled by control voltage signals $C_1$, $C_2$ and $C_3$ from a control signal generator 25 so as to be closed in response to the high level of the corresponding control voltage signal. The output voltages $V_a$, $V_b$ and $V_c$ are respectively applied to the input terminals of the analog switching elements $23_a$, $23_b$ and $23_c$, whose output terminals are commonly connected through a resistor 24 to the base of a driving transistor 21 having an emitter grounded through the exciting coil 9 and a collector connected to a d.c. power source $+V$.

In the analog switch circuit 23, the analog switching elements $23_a$ to $23_c$ are closed in a predetermined order in accordance with the control voltage signals from the control signal generator 25, and the one of the output voltages from the voltage generator 22 selected by the analog switch circuit 23 is applied through the resistor 24 to the base of the driving transistor 21 as a base bias voltage.

In this embodiment, the level of the output voltage $V_a$ is set to control the conductivity of the driving transistor 21 so as to apply the rated voltage $V_o$ of the exciting coil 9 across the exciting coil 9, and the level of the output voltage $V_b$ is set to control the conductivity of the driving transistor 21 so as to apply across the exciting coil 9 an initial exciting voltage $V_M$ ($<V_o$) for providing the minimum exciting energy required for engaging the solenoid clutch 2. Further, the level of the output voltage $V_c$ is set to control the conductivity of the driving transistor 21 so as to apply across the exciting coil 9 a disengaging voltage $V_N$ whose level is slightly less than that of the initial driving voltage $V_M$.

The set of control voltage signals $C_1$, $C_2$ and $C_3$ is produced from the control signal generator 25 in response to a command signal CS from a command signal generator 28 and these voltage signals $C_1$ to $C_3$ are applied to the analog switch circuit 23 so as to drive the solenoid clutch 2 with minimum mechanical shock. More specifically, at the start of the engaging operation of the solenoid clutch 2, the voltage signal $C_2$ is applied to the switch circuit 23 causing the initial exciting voltage $V_M$ to be applied to the exciting coil 9 for a predetermined period $T_1$, whereafter the voltage signal $C_1$ is applied to the switch circuit 23 causing the rated voltage $V_o$ to be applied to the exciting coil 9. On the other hand, at the time of the operation of disengaging the solenoid clutch 2, the signal voltage $C_3$ is applied to the switch circuit 23 causing the disengaging voltage $V_N$ to be applied to the exciting coil 9 for a predetermined period $T_2$ after the termination of the application of the rated voltage $V_o$. The command signal generator 28 has a clutch control switch 26 and a resistor 27, and one end of the clutch control switch 26 is connected to the d.c. voltage source $+V$ and the other end thereof is grounded through the resistor 27. The voltage developed across the resistor 27 when the clutch control switch 26 is closed is derived as the command signal CS.

Figure 2:
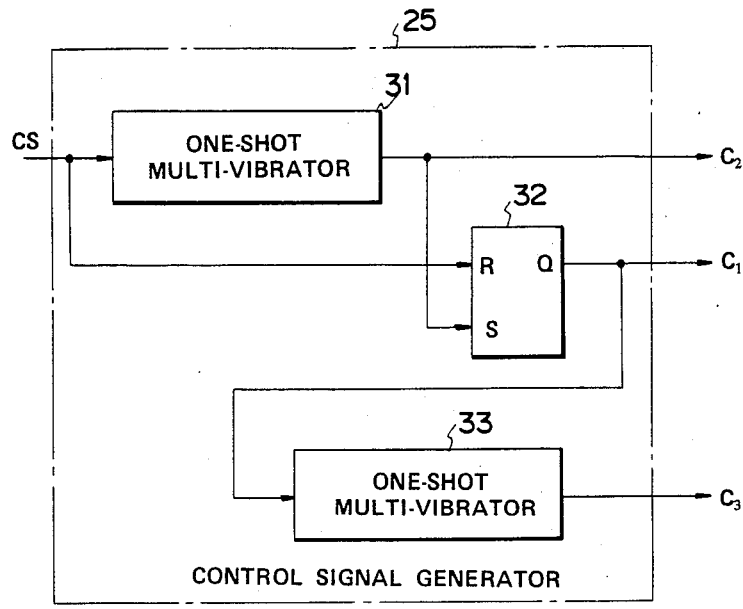
FIG. 2 is a detailed block diagram of the control signal generator shown in FIG. 1.
Figure 2:
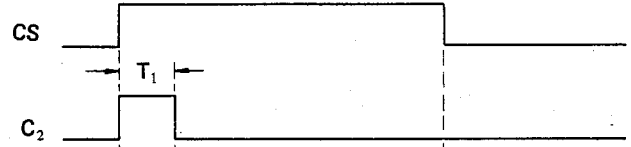
Figure 2:
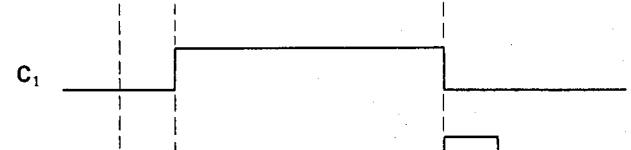
Figure 2:
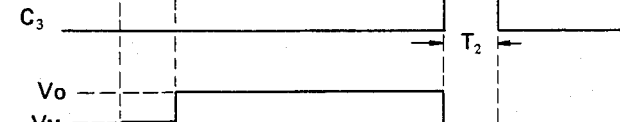
Figure 2:
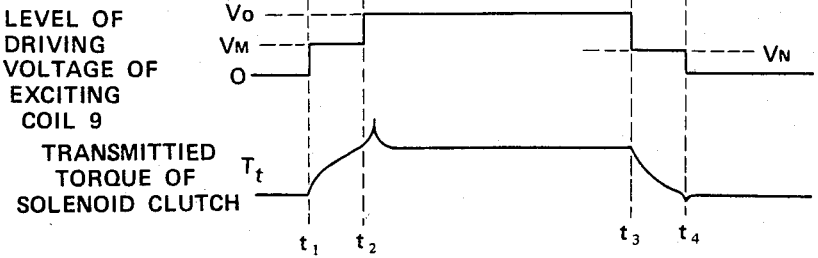

FIG. 2 is a detailed block diagram of the control signal generator 25. The control signal generator 25 has a one-shot multi-vibrator 31 which in response to the leading edge of the command signal CS produces a pulse with a pulse width of $T_1$ as the control voltage signal $C_2$. The output pulse from the one-shot multi-vibrator 31 is applied to a set terminal S of an R-S flip-flop 32 having a reset terminal R to which the command signal CS is applied. The R-S flip-flop 32 is reset when the level of the command signal CS changes from high to low and is set when the output level of the one-shot multi-vibrator 31 changes from high to low. The Q output of the R-S flip-flop 32 is used as the control voltage signal $C_1$ and is also applied to another one-shot multi-vibrator 33 as a trigger signal. The one-shot multi-vibrator 33 is responsive to the level change of the Q output of the R-S flip-flop from high to low and produces a pulse with a pulse width $T_2$ as the control voltage signal $C_3$. Consequently, when the command signal CS is applied to the control signal generator 25, it follows that the control voltage signal $C_2$ is followed by the control voltage signal $C_1$ and then the control voltage signal $C_3$ is produced. The ON/OFF operation of the analog switching elements $23_a$ to $23_c$ is controlled by the control voltage signals $C_1$ to $C_3$, respectively, and each of these analog switching elements $23_a$ to $23_c$ is turned ON when the level of the corresponding control voltage signal is high.

Now, the operation of the clutch driving circuit 1 will be described with reference to FIGS. 3A to 3F.

When the clutch control switch 26 is closed at time $t_1$ for putting the solenoid clutch 2 in the engaged state, the level of the command signal CS becomes high as shown in FIG. 3A, and the level of the command signal CS becomes low when the clutch control switch 26 is opened at time $t_3$ for putting the solenoid clutch 2 in the disengaged state. When the level of the command signal becomes high at time $t_1$, the one-shot multi-vibrator 31 is triggered, so that the level of the control voltage signal $C_2$ becomes high for the period $T_1$ as shown in FIG. 3B. At this time, the other control voltage signals $C_1$ and $C_3$ are in low level condition, so that only the analog switching element $23_b$ is closed between the time $t_1$ and $t_2$ to apply the output voltage $V_b$ to the base of the driving transistor 21. When the level of the control voltage signal $C_2$ becomes low at time $t_2$, the R-S flip-flop 32 is reset and the level of the control voltage signal $C_1$ is changed from low to high. As a result, the analog switching element $23_b$ is opened at time $t_2$ while the analog switching element $23_a$ is closed till the R S flip-flop 32 is reset by the command signal CS at time $t_3$. Thus, the initial exciting voltage $V_M$ is applied to the exciting coil 9 for the period $T_1$ from $t_1$ to $t_2$ and the rated voltage $V_o$ is applied thereto from $t_2$ to $t_3$.

Since the initial exciting voltage $V_M$, whose level is less than that of the rated voltage $V_o$, is applied to the exciting coil 9 for a short time ($T_1$) at the start of the engaging operation of the solenoid clutch 2 prior to the application of the rated voltage $V_o$ to the exciting coil 9, the clutch 2 is not completely engaged but is in slip condition between times $t_1$ and $t_2$. Although the transmitted torque $T_t$ is small at first, it gradually increases with the increase in the rotational speed of the auxiliary machine 15. The change in the transmitted torque $T_t$ is shown in FIG. 3F, wherein the torque $T_t$ is seen to gradually increase after time $t_1$.

In general, when the initial exciting voltage $V_M$ determined as described above is applied to the exciting coil 9, since the torque transmitted by the solenoid clutch is small, if the load torque for the solenoid clutch is kept at a constant value, the slip condition of the solenoid clutch 2 will be continued, resulting in insufficient torque transmission. The solenoid clutch 2 is required to transmit a torque $T_t$ which is greater than the sum of the torque $T_d$ required for driving the auxiliary machine 15 and the inertial torque $T_i$ of the auxiliary machine 15. As is well known, the inertial torque $T_i$ is proportional to the rotational speed of the auxiliary machine 15, the "rotational speed" in this case meaning the difference between the rotational speeds in the OFF and ON condition of the solenoid clutch 2. Since the inertial torque $T_i$ gradually decreases after time $t_1$, even if the torque transmitted by the solenoid clutch 2 is small at time $t_1$, it will increase with the passage of time, so that the solenoid clutch 2 will be engaged gradually.

When the voltage applied to the exciting coil 9 becomes equal to the rated voltage $V_o$ at time $t_2$ (see FIG. 3E), the solenoid clutch 2 is brought to the completely engaged state. In this case, since the voltage $V_M$ has been already applied to the exciting coil 9 prior to the application of the rated voltage $V_o$, assuming that $T_a$ is the transmitted torque when the voltage $V_M$ is applied thereto and $T_b$ is the transmitted torque when the voltage $V_o$ is applied thereto, the impact torque produced in the solenoid clutch 2 at this will be $T_b - T_a$.

Therefore, as compared with the case where the rated voltage $V_o$ is directly applied to engage the solenoid clutch 2, the impact torque produced at the time of the engagement will be remarkably reduced. The change in the torque transmitted by the solenoid clutch 2 in this case is shown in FIG. 3F. In this case, due to the delay in response, the peak of the impact torque produced by the application of the rated voltage $V_o$ to the exciting coil 9 at time $t_2$ appears after time $t_2$.

The disengaging operation of the solenoid clutch 2 will now be described. When the clutch control switch 26 is opened at time $t_3$ to disengage the solenoid clutch 2, the level of the command signal CS changes from high to low as shown in FIG. 3A. The level change in the command signal CS at time $t_3$ resets the R-S flip-flop 32, and the level of the control voltage signal $C_1$ changes from high to low. At the same time, the one-shot multi-vibrator 33 is triggered by the level change of the Q output of the R-S flip-flop 32 and the level of the control voltage signal $C_3$ becomes high for the period $T_2$ from $t_3$ to $t_4$. As a result, the analog switching element $23_a$ is opened at time $t_3$ and the analog switching element $23_c$ is closed from $t_3$ to $t_4$, so that the disengaging voltage $V_N$ is applied to the exciting coil 9 for period $T_2$ after the rated voltage $V_o$ is removed therefrom at time $t_3$ (see FIG. 3E).

The level of the disengaging voltage $V_N$ is set at a level slightly less than that of the initial exciting voltage $V_M$, taking account of the residual magnetism in the solenoid clutch 2. When the rated voltage $V_o$ is removed from the exciting coil 9 in response to the opening of the clutch control switch 26 and at the same time the disengaging voltage $V_N$ is applied thereto, the torque transmitted by the solenoid clutch 2 gradually decreases as shown in FIG. 3F. When the transmitted torque has fallen to zero at time $t_4$, the analog switch $23_c$ is turned OFF to turn OFF the driving transistor 21. Consequently, it is possible to remarkably reduce the mechanical shock which occurs in the solenoid clutch 2 when the driving transistor 21 is turned OFF at time $t_4$.

As will be understood from the foregoing description, the length of each of the periods $T_1$ and $T_2$ can be selected relative to the set values of the voltages $V_M$ and $V_N$ in such a way that the mechanical shock occurring at the engagement/disengagement of the solenoid clutch 2 is minimized. That is, the period $T_1$ should be set at the length required for the solenoid clutch 2 to reach full torque transmission after the voltage $V_M$ is applied to the exciting coil 9. On the other hand, the period $T_2$ should be set at the length required for solenoid clutch 2 to reach zero torque transmission after the applied voltage to the exciting coil 9 is changed from the rated voltage $V_o$ to the disengaging voltage $V_N$.

In this embodiment, the voltage level applied to the exciting coil 9 of the solenoid clutch 2 is changed in two steps when the solenoid clutch 2 is engaged or disengaged. However, the present invention is not limited to this arrangement but also encompasses driving circuits wherein the driving voltage level is changed in three or more steps when the solenoid clutch is engaged or disengaged.

I claim:

1. A circuit for driving a solenoid clutch which includes an electromagnet and ahs an input side rotating member and an associated output side rotating member, the input side rotating member and the output side rotating member being separated by a gap when the solenoid clutch is in the completley disengaged state, and one of said rotating members being moved to close the gap and brought into torque transmitting engagement with the other rotating member when said electromagnet is energized to bring the solenoid clutch into the engaged state, said circuit comprising:

means for producing a command signal for commanding the engagement/disengagement of the solenoid clutch;

a voltage generating means which is capable of generating at least a rated voltage of the solenoid clutch and an initial exciting voltage which is of a level less than said rated voltage and which is selected such that at least a minimum attracting force for closing the gap between said rotating members is provided to the electromagnet; and a control means responsive to said command signal for controlling the supply of the output voltage from said voltage generating means in such a manner that the rated voltage is applied to the electromagnet of the solenoid clutch after at least the initial exciting voltage is applied to the electromagnet for a predetermined period to close the gap and bring said rotating members into at least a partially torque transmitting state when engaging the solenoid clutch.

2. A circuit as claimed in claim 1 wherein said predetermined period is set at the length required for the solenoid clutch to reach full torque transmission after the initial exciting voltage is applied to the solenoid clutch.

3. A circuit as claimed in claim 1 wherein the command signal is a signal indicating the start timing of the engagement of the solenoid clutch and the start timing of the disengagement of the solenoid clutch.

4. A circuit as claimed in claim 1 wherein the voltage generating means has a voltage source for supplying a first voltage and a second voltage, a switching circuit for selectively deriving the first voltage or the second voltage in accordance with a control signal from said control means and a driving means responsive to the output voltage from said switching circuit for providing a driving voltage to the solenoid clutch in such a way that the rated voltage is applied to the solenoid clutch when the second voltage is derived and the initial exciting voltage is applied to the solenoid clutch when the first voltage is derived.

5. A circuit as claimed in claim 4 wherein said switching circuit has at least two analog switching elements provided for the first and second voltages, respectively, and the analog switching elements are operated by the control signal, whereby the first or second voltage is selectively derived.

6. A circuit as claimed in claim 5 wherein said control means has a first circuit responsive to the command signal for producing a first control signal for controlling said switching circuit in such a way that the second voltage is derived for the predetermined period and a second circuit responsive to the first control signal for producing a second control signal for controlling said switching circuit in such a way that the first voltage is derived after the output of the second voltage has terminated.

7. A circuit as claimed in claim 6 wherein said first circuit is a one-shot multi-vibrator which is triggered at the start timing of the engagement of the solenoid clutch in response to the command signal and said second circuit is a flip-flop circuit which is set in response to the trailing edge of an output pulse from the one-shot multi-vibrator, whereby the first control signal is derived from the one-shot multi-vibrator and the second control signal is derived from the flip-flop circuit.

8. A circuit for driving a solenoid clutch which includes an electromagnet and has an input side rotating member and an associated output side rotating member to be engaged with the input side rotating member, the input side rotating member and the output side rotating member being separated by a gap when the solenoid clutch is in the completely disengaged state, said circuit comprising:

means for producing a command signal for commanding the engagement/disengagement of the solenoid clutch;

a voltage generating means which is capable of generating at least the rated voltage of the solenoid clutch and an initial exciting voltage by which a minimum attracting force for the engagement is provided to the electromagnet and a disengaging voltage whose level is slightly less than that of the initial exciting voltage; and a control means responsive to said command signal for controlling the supply of the output voltage from said voltage generating means in such a manner that the rated voltage is applied to the solenoid clutch after at least the initial exciting voltage is applied to the solenoid clutch for a predetermined period when engaging the solenoid clutch and the disengaging voltage is applied to the solenoid clutch instead of the rated voltage for a predetermined period when disengaging the solenoid clutch.

9. A circuit as claimed in claim 8 wherein said predetermined period for applying the initial exciting voltage is set at the length required for the solenoid clutch to reach full torque transmission after the initial exciting voltage is applied to the solenoid clutch.

10. A circuit as claimed in claim 9 wherein said predetermined period for applying the disengaging voltage is set at the length required for the solenoid clutch to reach zero torque transmission after the disengaging voltage is applied to the solenoid clutch.

11. A circuit as claimed in claim 8 wherein the voltage generating means has a voltage source for supplying a first voltage, a second voltage and third voltage, a switching circuit for selectively deriving the first, second or third voltage in accordance with a control signal from said control means and a driving means responsive to the output voltage from said switching circuit for providing a driving voltage to the solenoid clutch in such a way that the rated voltage is applied to the solenoid clutch when the second voltage is derived, the initial exciting voltage is applied to the solenoid clutch when the first voltage is derived and the disengaging voltage is applied to the solenoid clutch when the third voltage is derived.

* * * * *